United States Patent [19]
Date et al.

[11] 3,785,352
[45] Jan. 15, 1974

[54] ROTARY PISTON INTERNAL COMBUSTION ENGINE

[75] Inventors: Tasuku Date, Tokyo; Junji Otani, Omiya, both of Japan

[73] Assignee: Honda Giken Kogyo Kabushiki Kaisha, Tokyo, Japan

[22] Filed: Sept. 25, 1972

[21] Appl. No.: 292,167

[30] Foreign Application Priority Data
Sept. 29, 1971  Japan................................ 46-75388

[52] U.S. Cl. .............................. 123/8.13, 123/8.07
[51] Int. Cl. ............................................ F02b 53/04
[58] Field of Search.................. 123/8.07, 8.13, 8.15, 123/325 T, 51 R, 51 AA, 51 BA, 53 R, 53 AA, 53 BA, 75 B

[56] References Cited
UNITED STATES PATENTS

| | | | |
|---|---|---|---|
| 1,434,446 | 11/1922 | McQueen | 123/8.07 |
| 2,269,948 | 1/1942 | Mallory | 123/53 A |
| 2,415,506 | 2/1947 | Mallory | 123/53 A |

*Primary Examiner*—Al Lawrence Smith
*Assistant Examiner*—Michael Koczo, Jr.
*Attorney*—Eric H. Waters et al.

[57] ABSTRACT

A rotary piston engine that can operate efficiently with a lean fuel-air mixture, producing clean exhaust gases. It includes two rotors arranged in respective cavities and an ignition chamber arranged in communication with the combustion chambers defined in said respective cavities. A richer mixture is fed in one of the two combustion chambers than in the other and compressed to a higher extent so that the ignition chamber is filled with such mixture and the combustion flame formed therein is used to ignite the lean mixture fed in the other, major combustion chamber.

4 Claims, 1 Drawing Figure

PATENTED JAN 15 1974                                      3,785,352
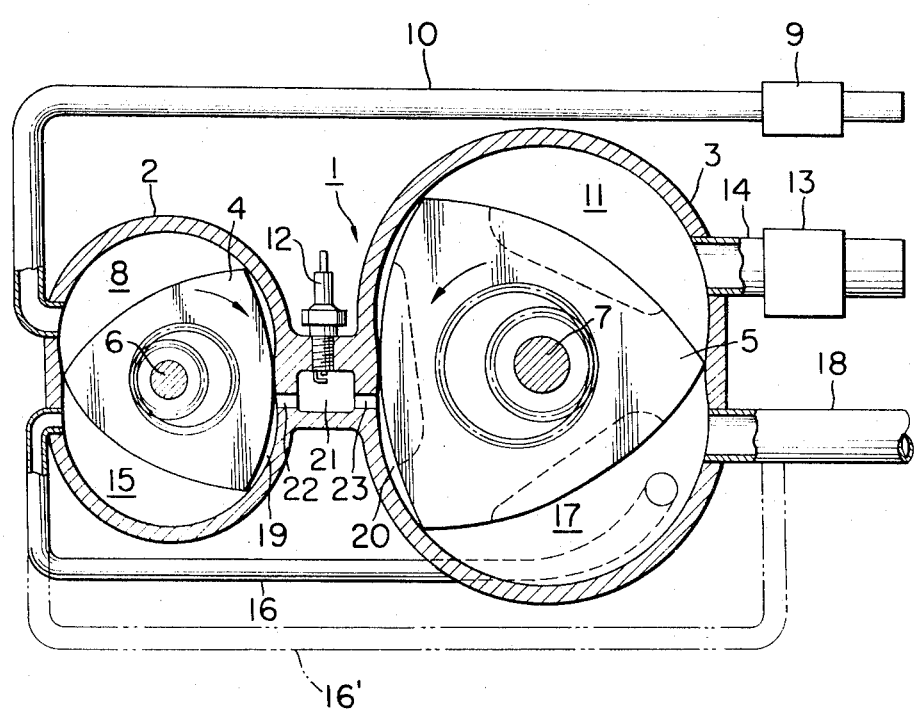

ROTARY PISTON INTERNAL COMBUSTION ENGINE

BACKGROUND AND SUMMARY OF THE INVENTION

The present invention relates to rotary piston internal combustion engines and has for its object the provision of a novel rotary piston internal combustion engine which is adapted to operate in a stable manner with an improved ignition characteristic enabling use of a lean fuel-air mixture for substantial reduction in amounts of harmful ingredients occurring in the engine exhaust and for economic engine operation.

To attain the above object, the present invention proposes to divide the combustion space of a rotary piston internal combustion engine into two parts, i.e., a first combustion chamber adapted to be fed with a rich fuel-air mixture and a second, major combustion chamber adapted to be fed with a lean fuel-air mixture, and to direct the rich mixture into an ignition chamber separately formed in communication with both of the two combustion chambers so that the lean mixture in the second combustion chamber may be effectively ignited to burn by the combustion flame of the rich mixture even if the lean mixture in itself can hardly be ignited by electric sparking because of its lean fuel-air mixture.

BRIEF DESCRIPTION OF THE DRAWING

The accompanying drawing represents a vertical cross-sectional view of a preferred embodiment of the present invention.

DESCRIPTION OF THE PREFERRED EMBODIMENT

The present invention will now be described in detail with reference to the accompanying drawing, which illustrates one preferred embodiment of the invention.

As illustrated therein, the rotary piston engine includes a body or housing structure 1 in which a first cavity 2 and a second cavity 3 larger in volume than that of the first cavity 2 are formed independently from each other, and in the first cavity 2 a first rotary piston or rotor 4 formed with an integral internal gear is accommodated for rolling engagement with a first fixed gear 6 while in the second cavity 3 a second rotary piston or rotor 5 is accommodated for rolling engagement with a second fixed gear 7. It is to be understood that the two rotors 4 and 5 are fixed to respective output shafts, not shown, and which shafts are interconnected so as to rotate in phase with each other.

Reference numeral 8 indicates a suction chamber formed in the first cavity 2 and communicating with a first carburetor 9, adjusted to form a rich fuel-air mixture, by way of a first intake pupe 10; 11 indicates a suction chamber formed in the second cavity 3 and communicating with a second carburetor 13, adjusted to form lean fuel-air mixture, by way of a second intake pipe 14; and 15 indicates an exhaust chamber formed in the first cavity 2 and communicating with an exhaust chamber 17 formed in the second cavity 3 through the intemediary of an exahust pipe 16 interconnecting the two exhaust chambers or directly with the exhaust stack 18 extending from the exhaust chamber 17 through the intermediary of an exhaust pipe 16', as shown in dotted lines.

Reference numeral 19 indicates a first combustion chamber formed in the first cavity 2; and 20 indicates a second combustion chamber formed in the second cavity 3 in a position substantially opposite to the first combustion chamber 19. As shown, an ignition chamber 21 is formed in the housing structure 1 between the first and second cavities 2 and 3 and provided with a spark plug 12. The first and second combustion chambers 19 and 20 are in communication with the ignition chamber 21 by way of respective torch nozzles 22 and 23 formed in the opposite side walls of the ignition chamber, and are designed so that in the first combustion chamber 19 a compression ratio is obtained which is slightly higher than that obtained in the second combustion chamber 20 and thus part of the rich mixture compressed in the first combustion chamber 19 is forced to flow into the ignition chamber 21 until the pressures in the first and second combustion chambers 19 and 20 are balanced with each other.

In operation of the rotary piston engine, the first and second rotors 4 and 5 are driven to turn in phase with each other in respective directions, as indicated by the arrows and, when the rich fuel-air mixture fed into the first combustion chamber 19 and the lean fuel-air mixture fed into the second combustion chamber 20 are both compressed to their respective minimum volumes, the ignition chamber 21 is filled solely with the rich fuel-air mixture compressed in the first combustion chamber 19, which flows through the torch nozzle 22 into the ignition chamber 21 until the first and second combustion chambers 19 and 20 are balanced in pressure, since the compression ratio obtained in the first combustion chamber 19 is higher than that obtained in the second combustion chamber 20, as described hereinbefore.

At this point, when the spark plug 12 is fired, the compressed rich fuel-air mixture in the ignition chamber 21 is readily ignited and the combustion flame thus formed therein jets into the first and second combustion chambers 19 and 20 through respective torch nozzles 22 and 23 to cause combustion of the rich and lean mixtures in the respective combustion chambers 19 and 20. It will be readily understood that, as the frist combustion chamber 19 expands, the combustion gases formed therein flow into the exhaust chamber 17 in the second cavity 3 through the exhaust pipe 16 or directly into the exhaust stack 18 through the exhaust pipe 16' to join with the combustion gases formed in the second combustion chamber 20 and including a large proportion of air, and thus can be burned once again in the exhaust chamber 17 or in the exhaust stack 18.

To summarize, the rotary piston engine of the present invention has a combustion space divided into first and second combustion chambers 19 and 20, both of which are in communication with an ignition chamber 21 provided with a spark plug 12, and is so arranged that, in the compression stroke, part of the rich mixture previously fed in the first combustin chamber 19 is forced to flow into the ignition chamber 21. This apparently serves to improve the fuel ignition characteristic of the engine in which a spark plug such as indicated at 12 is used and thus enables stable engine operation.

The lean mixture fed into the second combustion chamber 20 can readily be ignited by the combustion flame formed in the ignition chamber 21 even if the mixture in itself can hardly be ignited by any usual ignition spark means such as spark plug 12. This means that the engine can operate efficiently with as a whole relatively lean fuel-air mixture and thus occurrence of carbon monoxide and other harmful can be ingredients in the engine exhaust can be effectively suppressed.

It will be readily appreciated from the foregoing that, according to the present invention, there is provided a rotary piston engine which is particularly adapted for economic operation and improved in cleanliness of exhaust gases it produces.

It will be readily appreciated from the foregoing description that, according to the present invention, there is provided a rotary piston engine which is particularly adapted for economic operation and for cleanliness of the exhaust gases of which is much cleaner than usual.

Although one preferred embodiment of the invention has been shown and described herein, it will be apparent to those skilled in the art that many changes and modifications may be made therein without departing from the spirit and scope of the claimed invention.

What is claimed is:

1. A rotary piston internal combustion engine comprising a first combustion chamber defined in a first cavity by a first rotor housed therein and adapted to be fed with rich fuel-air mixture, a second combustion chamber defined in a second cavity by a second rotor housed therein and adapted to be fed with lean fuel-air mixture and an ignition chamber communicating with said first and second combustion chambers by way of respective torch nozzles, the arrangement being such that only richer fuel-air mixture fed in said first combustion chamber is allowed to enter said ignition chamber.

2. An engine as claimed in claim 1, in which said first and second combustion chambers are designed to give a higher compression ratio in said first combustion chamber than in said second combustion chamber whereby the richer fuel-air mixture fed in said first combustion chamber is forced to flow into said ignition chamber while effectively scavenging the latter, any burned gases previously remaining therein being driven off into said second combustion chamber.

3. An engine as claimed in claim 2, in which said second combustion chamber is larger in volume than said first combustion chamber.

4. An engine as claimed in claim 1, in which said first combustion chamber is provided with exhaust means for discharging combustion gases formed therein into said second cavity at a location adjacent to the exhaust port of said second combustion chamber whereby said combustion gases are burned once again under the heat of said second combustion chamber.

* * * * *